United States Patent Office 3,631,175
Patented Dec. 28, 1971

3,631,175
DERIVATIVES OF PYRANO[3,2-d]OXAZOLE
Real Laliberte, Laval, Quebec, Canada, assignor to Ayerst, McKenna and Harrison Limited, Ville St. Laurent, Quebec, Canada
No Drawing. Filed Apr. 14, 1970, Ser. No. 28,540
Int. Cl. C07d 85/28
U.S. Cl. 260—307          17 Claims

ABSTRACT OF THE DISCLOSURE

Pyrano[3,2-d]oxazole derivatives of the formula

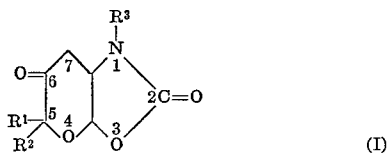

in which $R^1$ represents an aromatic group such as phenyl, benzyloxyphenyl, 3,4-xylyl, α-hydroxybenzyl, diphenylmethyl, 4-biphenylyl and 4'-chloro-4-diphenylyl; $R^2$ represents hydrogen, lower alkyl, chloromethyl, phenyl, and benzyl; or $R^1$ or $R^2$ together represent the cyclohexane ring attached in spiral fashion to the pyranone ring in such a manner that carbon atom 5 of the pyrano ring is common to the cyclohexane ring; and $R^3$ is lower alkyl, phenyl or 4-chlorophenyl. The compounds are useful as fungicidal and amebicidal agents, and methods for their use and a process for preparing them and intermediates used in their syntheses are also disclosed. The compounds of Formula I are useful as fungicidal and amebicidal agents, and the intermediates of Formula III are useful as coccidiostatic agents. Methods for their use, and a process for preparing the compounds of Formula I and intermediates used in their syntheses are also disclosed.

BACKGROUND OF THE INVENTION

This invention relates to derivatives of pyrano[3,2-d] oxazoles and to intermediates in their syntheses.

The compounds of this invention have valuable fungicidal and amebicidal properties which make them useful as fungicidal and amebicidal agents.

SUMMARY OF THE INVENTION

The pyrano[3,2-d]oxazole derivatives of this invention may be represented by Formula I

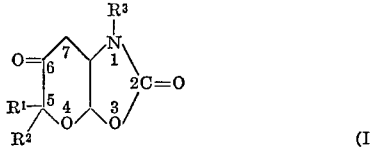

in which $R^1$ represents an aromatic group such as phenyl, 3,4-xylyl, benzyloxyphenyl, α-hydroxybenzyl, diphenylmethyl, 4-biphenylyl and 4'-chloro-4-biphenylyl; $R^2$ represents hydrogen, lower alkyl, chloromethyl, phenyl, and benzyl; or $R^1$ and $R^2$ together represent the cyclohexane ring attached in spiral fashion to the pyrano[3,2-d]oxazole in such a manner that carbon atom 5 of the pyrano [3,2-d]oxazole is common to the cyclohexane ring; and $R^3$ is lower alkyl, phenyl or 4-chlorophenyl.

DETAILS OF THE INVENTION

The derivatives of pyrano[3,2-d]oxazole of this invention have been found to possess valuable fungicidal and amebicidal activities and are useful as fungicidal and amebicidal agents. For example, when tested for their anti-fungal activity by the method described in "Antiseptics, Disinfectants, Fungicides, and Chemical and Physical Sterilization," Lea and Febiger, Philadelphia, 1957, they have been found to inhibit the growth of *Candida albicans*, *Trichophyton granulosum*, and *Microsporum gypseum*.

When the compounds of this invention are used as fungicidal agents it is preferred to use them topically in the form of solutions, creams or lotions in pharmaceutically acceptable vehicles. Such formulations for topical use may contain 0.1 to 5.0 percent of the active ingredient, and may be applied topically to infected areas of the skin from one to several times daily.

When the compounds of this invention are tested for their amedicidal activity, for example, by the method described by Laidlaw et al. published in Parasitology, vol. 20, p. 207, 1928, they have been found to inhibit the growth of *Entamoeba histolytica*, and are useful as amebicidal agents.

When the compounds of this invention are employed as amebicidal agents in warm-blooded animals, e.g., rats, they may be used alone or in combination with pharmacologically acceptable carriers. The proportion of these compounds is determined by the solubility and chemical nature of the compound, chosen route of administration and standard biological practice. For example, they may be administered orally in solid form containing such excipients as starch, milk sugar, certain types of clay and so forth. They may also be administered orally in the form of suspensions, or they may be injected parenterally. For parenteral administration they may be used in the form of sterile solution in pharmaceutically acceptable non-aqueous vehicles such as, for example, in vegetable oils, or in suspension or dispersion in aqueous vehicles containing pharmaceutically acceptable suspending or dispersing agents.

The dosage of the present theropeutic agents will vary with the form of administration and the particular compound chosen. Furthermore, it will vary with the particular host under treatment. Generally, treatment is initiated with small dosages substantially less than the optimum dose of the compounds. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 0.1 mg. to about 100 mg. per kilo per day, although as aforementioned variations will occur. However, a dosage level that is in the range of from about 1.0 mg. to about 20 mg. per kilo per day is most desirably employed in order to achieve effective results.

For oral use, it is preferred to formulate the compounds of this invention in the form of tablets, coated tablets, or capsules with the excipients mentioned above and containing from 25–250 mg. of the active ingredient. For parenteral administration the compounds of this invention are preferably dissolved in pharmaceutically acceptable oils, or they are suspended or dispersed in aqueous vehicles containing pharmaceutically acceptable suspending or dispersing agents, and such solutions, dispersions or suspensions may contain from 25–250 mg. of the active ingredient per milliliter.

The intermediates of Formula III have been found to possess valuable coccidiostatic activities. For example, when tested by a modification of the method described in "Experimental Chemotherapy" vol. 1, Academic Press, New York and London 1963, those compounds have been found to decrease the severity of infections with *Eimeria tenella* in chickens and so to be useful as coccidiostatic agents.

In the modification of the above text, male domestic chickens, 12 to 14 days old, in groups of ten each are inoculated with sufficient sporulated oocysts of *Eimeria tenella* to produce at least 50 percent mortality and substantially no weight gains within 8 days. One group of chickens so infected is kept as untreated control; one group is treated with such doses of a commercial coccidiostatic agent as to give 100 percent survivors and a weight gain of about 65–85 percent of body weight within 8 days; and the third group is treated with the compound to be tested, which is considered to be active when producing 90–100 percent survivors and a weight gain of at least 50 percent within 8 days. The comercial coccidiostatic agent and the compound to be tested are mixed with the feed (soybean flour and commercial chicken starter) in various concentrations and are administered ad libitum. When tested in this manner the intermediates of Formula III are found to be active in concentrations of 0.05 percent.

The compounds of this invention may be prepared in a convenient manner by the following route.

The starting materials of Formula II are conveniently prepared in the following manner.

Furan is treated with an alkali metal alkyl, preferably butyllithium, and reacted with a carbonyl compound of the formula $R^1R^2CO$ in which $R^1$ and $R^2$ are as defined in the first instance, except that they may also represent together with the group CO the cyclohexanone ring to obtain the correspondingly substituted 2-furylmethanol. Said last-named compound is treated with an oxidizing agent such as, for example peracid or a N-haloacetamide or N-halosuccinimide, preferably peracetic or m-chloroperbenzoingly substituted compounds of this invention of Formula I.

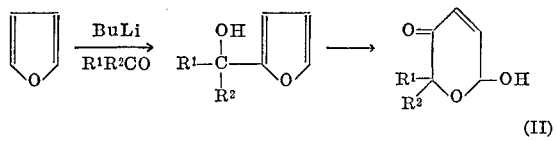

A suitably substituted 6-hydroxy-2H-pyran-3(6H)-one of the Formula II in which $R^1$ and $R^2$ are as defined in the first instance is treated with an isocyanate of the formula $R^3NCO$ in which $R^3$ is as defined in the first instance, to yield the corresponding carbamates of the Formula III in which $R^1$, $R^2$ and $R^3$ are as defined in the first instance. This reaction is usually carried out in an inert solvent in the presence of a basic condensing agent. Preferred reaction conditions include the use of an aromatic hydro-carbon solvent such as, for example, benzene, and of sodium acetate, pyridine or triethylamine as the basic condensing agent, at temperatures at or about room temperature, and for periods of time of from one-half to several hours. Evaporation of the solvent or addition of an aliphatic hydrocarbon such as hexane yields the desired intermediate carbamate of Formula III.

Heating of said last-named compound in solution in a lower alkanol such as, for example methanol, or in an aromatic hydrocarbon solvent such as, for example, benzene in the optional presence of a basic condensing agent such as, for example, triethylamine, yields the correspondingly substituted compounds of this invention of Formula I.

Alternatively, the starting materials of Formula II in which $R^1$ and $R^2$ are as defined in the first instance may be heated together with the isocyanates of formula $R^3NCO$ to yield directly the correspondingly substituted compounds of Formula I. Preferred conditions for this reaction include the use of an aromatic hydrocarbon solvent such as, for example benzene, in the optional presence of a basic condensing agent such as, for example pyridine or triethylamine, for prolonged periods of time and preferably at or near the reflux temperature of the mixture. Evaporation of the solvent and/or addition of an aliphatic hydrocarbon such as, for example hexane, precipitates the desired compound of Formula I which is purified by crystalization or chromatography.

The following formulae and examples will illustrate this invention:

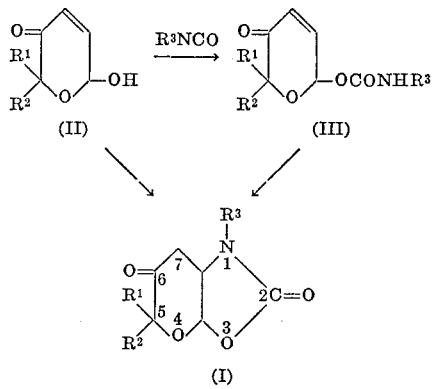

Example 1.—Substituted 2-furylmethanols

A freshly prepared cold solution of n-butyllithium in dry ether is added to a molar excess of freshly distilled furan dissolved in about 9 parts of dry ether. The mixture is stirred at 10–15° C. for one hour under a blanket of nitrogen, and 0.9 molar equivalent of the carbonyl compound $R^1R^2CO$, optionally dissolved in about 3–4 parts of ether, is added slowly with stirring while keeping the temperature at 5–10° C., and the mixture is allowed to stand at room temperature for 1–24 hours. Water in tetrahydrofuran is added, the ether layer is separated, washed with bicarbonate and water, dried, and evaporated to yield the desired substituted 2-furylmethanol.

In this manner, when using the carbonyl compounds listed below, the following substituted 2-furylmethanols are obtained. When cyclohexanone is used as the carbonyl compound, the product obtained is 1-(2'-furyl)-cyclohexan-1-ol.

| Carbonyl compound | 2-furylmethanol |
|---|---|
| Benzaldehyde | α-Phenyl-2-furylmethanol, oil, $\gamma_{max.}^{Film}$ 3550, 1600, 725, 690 cm.$^{-1}$. |
| α-Chloroacetophenone | α-Chloromethyl-α-phenyl-2-furylmethanol, oil, $\gamma_{max.}^{Film}$ 3525, 1450, 1425, 1000, 730, 700 cm.$^{-1}$. |
| 3,4-dimethylbenzophenone | α-Phenyl-α-(3,4-xylyl)-2-furylmethanol, oil, $\gamma_{max.}^{Film}$ 3520, 1615 cm.$^{-1}$. |
| p-Benzyloxybenzaldehyde | α-(p-Benzyloxyphenyl)-2-furylmethanol, M.P. 77–78° C. (ether-hexane). |
| Deoxybenzoin | α-Benzyl-α-phenyl-2-furylmethanol, oil, $\gamma_{max.}^{Film}$ 3530, 3420, 1600, 1490 cm.$^{-1}$. |
| Benzoylphenylcarbinol | α-(α-Hydroxybenzyl)-α-phenyl-2-furylmethanol, oil, $\gamma_{max.}^{CHCl_3}$ 3590, 3520, 1600, 1495, 700 cm.$^{-1}$. |
| Diphenylacetaldehyde | α-Diphenylmethyl-2-furylmethanol, oil, $\gamma_{max.}^{Film}$ 3540, 3400, 1600 cm.$^{-1}$. |
| p-Phenylacetophenone | α-(4-biphenylyl)-α-methyl-2-furylmethanol, M.P. 54–56° C. (ether-pentane) |
| p-Phenylpropiophenone | α-(4-biphenylyl)-α-ethyl-2-furylmethanol, oil, $\gamma_{max.}^{Film}$ 3560, 3450, 1610 cm.$^{-1}$. |
| p-Phenylbutyrophenone | α-(4-biphenylyl)-α-n-propyl-2-furylmethanol, $\gamma_{max.}^{Nujol}$ 3550, 1605 cm.$^{-1}$. |
| 4-(p-chlorophenyl)-acetophenone. | α-[(4'-chloro-(4-biphenylyl)]-α-methyl-2-furylmethanol M.P. 84–85° C. (ether-hexane). |
| Cyclohexanone | 1-(2'-furyl)-cyclohexan-1-ol, B.P. 106–107° C./13 mm. |

Example 2.—2-substituted 6-hydroxy-2H-pyran-3(6H)-ones (II)

The substituted 2-furylmethanol prepared as described in Example 1 is dissolved in 15–25 parts of chloroform, the solution is cooled to 0°–5° C., 1.1–1.85 molar equivalents of peracetic, m-chloroperbenzoic, or p-nitroperbenzoic acid are added in small portions with constant stirring while keeping the temperature below 5° C., the mixture is stirred at room temperature for 30–90 minutes, and cooled in an ice bath. The precipitate is filtered and the filtrate washed successively with 10% aqueous solutions of potassium iodide, 10% sodium thiosulfate, 10% sodium bicarbonate, and water, dried with anhydrous magnesium sulfate, and evaporated. The residue is purified by chromatography on silica gel or by crystallization to yield the desired 2-substituted 6-hydroxy-2H-pyran-3(6H)-one. In this manner, when using the substituted 2-furylmethanols listed below, the following 2-substituted 6-hydroxy-2H-pyran-3(6H)-ones are obtained. When using 1-(2'-furyl)-cyclohexan-1-ol as starting material, the product obtained is 2,2-pentamethylene-6-hydroxy-2H-pyran-3(6H)-one.

| Substituted 2-furylmethanol | 2-substituted 6-hydroxy-2H-pyran-3(6H)-one |
|---|---|
| α-Phenyl- | 2-phenyl-, M.P. 74–75° C. (ether-hexane). |
| α-Chloromethyl-α-phenyl- | 2-chloromethyl-2-phenyl-, M.P. 121–122° C. (ether-hexane). |
| α-Phenyl-α-(3,4-xylyl)- | 2-phenyl-2-(3,4-xylyl)-, M.P. 158–160° C. (ether-hexane). |
| α-(p-Benzyloxyphenyl)- | 2-(p-benzyloxyphenyl)-, M.P. 92–94° C. (ether-hexane). |
| α-Benzyl-α-phenyl- | 2-benzyl-2-phenyl-, M.P. 112–114° C. (methylcyclohexane-xylene). |
| α-(A-Hydroxybenzyl)-α-phenyl-. | 2-(α-hydroxybenzyl)-2-phenyl-, M.P. 130–132° C. (acetone-hexane). |
| α-Diphenylmethyl- | 2-(diphenylmethyl)-, M.P. 159–160° C. (acetone-hexane). |
| α-(4-biphenylyl)-α-methyl- | 2-(4-biphenylyl)-2-methyl-, M.P. 166–167° C. (acetone-hexane). |
| α-(4-biphenylyl)-α-ethyl- | 2-(4-biphenylyl)-2-ethyl-, M.P. 159–160° C. (acetone-hexane). |
| α-(4-biphenylyl)-α-n-propyl- | 2-(4-biphenylyl)-2-n-propyl-, M.P. 147° C. (ethyl acetate-hexane). |
| α-[4'-chloro-(4-biphenylyl)]-α-methyl-. | 2-[4'-chloro-(4-biphenylyl)]-2-methyl-, M.P. 159–160° C. (acetone-hexane). |
| 1-(2'-furyl)-cyclohexan-1-ol | 2,2-pentamethylene-, B.P. 115–118° C./0.07 mm. |

Example 3.—2-substituted 6-hydroxy-2H-pyran-3(6H)-one-N-substituted-carbamates (III)

A solution of the 2-substituted 6-hydroxy-2H-pyran-3(6H)-one obtained as described in Example 2 in 10–50 parts of benzene or 25–35 parts of chloroform or 30–40 parts of ether is stirred at room temperature for 0.5–24 hours with 1.5–3.5 molar equivalents of an isocyanate of the formula $R^3NCO$ in which $R^3$ is as defined in the first instance and 0.25–5 molar equivalents of triethylamine or 0.1–4 molar equivalents of pyridine. The mixture is evaporated under reduced pressure to about ⅔ of its original volume, filtered, the filtrate is washed with water, dried over anhydrous magnesium sulfate, and evaporated. Chromatography on silica gel or crystallization of the residue yields the desired carbamate of Formula III. In this manner, when using the 2-substituted 6-hydroxy-2H-pyran-3(6H)-ones and the isocyanates listed below, the following 2-substituted 6-hydroxy-2H-pyran-3(6H)-one N-substituted carbamates are obtained. When using 2,2 - pentamethylene - 6 - hydroxy - 2H - pyran-3(6H)-one and phenyl isocyanate the corresponding N-phenyl carbamate is obtained.

| 2-substituted 6-hydroxy-2H-pyran-3(6H)-one | Isocyanate $R^3NCO$ $R^3=$ | 2-substituted 6-hydroxy-2H-pyran-3(6H)-one N-substituted carbamate |
|---|---|---|
| 2-phenyl- | Phenyl | 2-phenyl-, N-phenyl carbamate M.P. 152–154° C. (toluene). |
| 2-chloromethyl-2-phenyl-. | Methyl | 2-chloromethyl-2-phenyl-, N-methyl carbamate M.P. 184–185° C. (acetone-hexane). |
| 2-phenyl-2-(3,4-xylyl)-. | n-Butyl | 2-phenyl-2-(3,4-xylyl)-, N-butyl carbamate $\gamma_{max}^{CHCl_3}$ 3450, 1470, 1695 cm.$^{-1}$. |
| Do | Phenyl | 2-phenyl-2-(3,4-xylyl)-, N-phenyl carbamate $\gamma_{max}^{CHCl_3}$ 3440, 1750, 1693 cm.$^{-1}$. |
| 2-(p-benzyloxyphenyl)-. | Methyl | 2-(p-benzyloxyphenyl)-, N-methyl carbamate, M.P. 141–142° C. (acetone-hexane). |
| 2-benzyl-2-phenyl- | Phenyl | 2-benzyl-2-phenyl-, N-phenyl carbamate $\gamma_{max}^{CHCl_3}$ 3445, 1750, 1695 cm.$^{-1}$. |
| 2-(α-hydroxybenzyl)-2-phenyl. | Methyl | 2-(α-hydroxybenzyl)-2-phenyl-, N-methyl carbamate, M.P. 140–141° C., (acetone-hexane). |
| 2-(diphenylmethyl)-. | do | 2-(diphenylmethyl)-, N-methyl carbamate, M.P. 166–167° C. (ether or methanol). |
| 2-(4-biphenylal)-2-methyl-. | do | 2-(4-biphenylyl)-2-methyl-, N-methyl carbamate, M.P. 127–128° C., (acetone-hexane). |
| 2-(4-biphenylyl)-2-ethyl-. | do | 2-(4-biphenylyl)-2-ethyl-, N-methyl carbamate, M.P. 123–124° C. (ethyl acetate-hexane). |
| 2-(4-biphenylyl)-2-n-propyl-. | do | 2-(4-biphenylyl)-2-n-propyl-,N-methyl carbamate, M.P. 108–110° C. (ethyl acetate-hexane). |
| 2-(4-biphenylyl)-2-methyl-. | Ethyl | 2-(4-biphenylyl)-2-methyl-, N-ethyl carbamate, M.P. 90–92° C. (acetone-hexane). |
| Do | n-Propyl | 2-(4-biphenylyl)-2-methyl-, N-propyl carbamate, M.P. 100–101° C. (toluene-hexane). |
| Do | n-Butyl | 2-(4-biphenylyl)-2-methyl-, N-butyl carbamate, M.P. 83–84° C. (hexane). |
| Do | Phenyl | 2-(4-biphenylyl)-2-methyl-, N-phenyl carbamate, M.P. 146–147° C. (chloroform-hexane). |
| Do | p-Chlorophenyl. | 2-(4-biphenylyl)-2-methyl-, N-(p-chlorophenyl)carbamate, M.P. 132–133° C. (chloroform-hexane). |
| 2-[4'-chloro-(4-biphenylyl)]-2-methyl. | Methyl | 2-[4'-chloro-(4-biphenylyl)]-2-methyl-, N-methyl carbamate, M.P. 151–152° C. (acetone-hexane). |
| 2,2-pentamethylene-. | Phenyl | 2,2-pentamethylene-, N-phenyl carbamate $\gamma_{max}^{CHCl_3}$ 1750 cm.$^{-1}$. |

Example 4.—1,5-disubstituted and 1,5,5-trisubstituted dihydro-5H-pyrano[3,2-d]oxazole-2,6[1H,7H]diones (1)

A solution of the N-substituted carbamate obtained as described in Example 3 in 20–25 parts of methanol, or in 30–40 parts of benzene with or without a trace of triethylamine, is refluxed for 1–24 hours. The mixture is evaporated under reduced pressure and the residue purified by chromatography or crystallization, to yield the correspondingly substituted dihydro - 5H - pyrano[3,2-d]oxazole-2,6[1H,7H]dione.

Alternatively, a mixture of the 2-substituted 6-hydroxy-2H-pyran-3(6H)-one obtained as described in Example 2 in 10–50 parts of benzene, 1.5–3.5 molar equivalents of an isocyanate of the formula $R^3NCO$ in which $R^3$ is as defined in the first instance, and 0.25–5.0 molar equivalents of triethylamine is refluxed for 1–24 hours and worked up as described above, to yield the same compounds as described above.

In this manner, when using as starting materials the N-substituted carbamates described in Example 3 or the 2-substituted 6-hydroxy-2H-pyran-3(6H)-ones described in Example 2, the following 1,5-disubstituted and 1,5-5-trisubstituted dihydro-5H-pyrano[3,2-d]oxazole - 2,6[1H, 7H]diones are obtained. When using 2,2-pentamethylene-6-hydroxy-2H-pyran-3(6H)-one or its N-phenyl carbamate as starting material, dihydro-1'-phenylspiro[cyclohexane-1,5'-5'H-pyrano[3,2-d]oxazole]-2',6'-[1H,7H]dione is obtained.

| 2-substituted 6-hydroxy-2H-pyran-3(6H)-one N-substituted carbamate | 1,5-disubstituted and 1,5,5-trisubstituted dihydro-5H-pyrano[3,2-d]-oxazole-2,6[1H, 7H]-dione |
|---|---|
| 2-phenyl-, N-phenyl carbamate. | 1,5-diphenyl-$\gamma_{max}^{CHCl_3}$ 1720, 1767 cm.$^{-1}$. |
| 2-chloromethyl-2-phenyl-, N-methyl carbamate. | 1-methyl-5-chloromethyl-5-phenyl-$\gamma_{max}^{CHCl_3}$ 1762 cm.$^{-1}$. |
| 2-phenyl-2-(3,4-xylyl)-, N-butyl carbamate. | 1-butyl-5-phenyl-5-(3,4-xylyl)-M.P. 105–107° C. (ether-hexane). |
| 2-phenyl-2-(3,4-xylyl)-, N-phenyl carbamate. | 1,5-diphenyl-5-(3,4-xylyl)-M.P. 204–207° C. (toluene or 2-pentanone). |

| 2-substituted 6-hydroxy-2H-pyran-3(6H)-one N-substituted carbamate | 1,5-disubstituted and 1,5,5-trisubstituted dihydro-5H-pyrano[3,2-d]-oxazole-2,6[1H, 7H]-dione |
|---|---|
| 2-(p-benzyloxyphenyl)-, N-methyl carbamate. | 1-methyl-5-(p-benzyloxyphenyl)-$\gamma_{max.}^{CHCl_3}$ 1765 cm.$^{-1}$. |
| 2-benzyl-2-phenyl-, N-phenyl carbamate. | 1,5-diphenyl-5-benzyl-M.P. 205-206° C. (isopropanol). |
| 2-(α-hydroxybenzyl)-2-phenyl-, methyl carbamate. | 1-methyl-5-(α-hydroxybenzyl)-5-phenyl-$\gamma_{max.}^{CHCl_3}$ 1768 cm.$^{-1}$. |
| 2-(diphenylmethyl)-, N-methyl carbamate. | 1-methyl-5-(diphenylmethyl)-$\gamma_{max.}^{CHCl_3}$ 1763 cm.$^{-1}$. |
| 2-(4-biphenyl)-2-methyl-, N-methyl carbamate. | 1,5-dimethyl-5-(4-biphenylyl)-M.P. 189-190° C. (bezene). |
| 2-(4-biphenylyl)-2-ethyl-, N-methyl carbamate. | 1-methyl-5-ethyl-5-(4-biphenylyl)-M.P. 197-198° C. (methanol). |
| 2-(4-biphenylyl)-2-n-propyl-, N-methyl carbamate. | 1-methyl-5-n-propyl-5-(4-biphenylyl)-M.P. 155° C. (methanol). |
| 2-(4-biphenylyl)-2-methyl-, N-ethyl carbamate. | 1-ethyl-5-(4-biphenylyl)-5-methyl-M.P. 183-189° C. (methanol). |
| 2-(4-biphenylyl)-2-methyl-, N-propyl carbamate. | 1-propyl-5-(4-biphenylyl)-5-methyl-M.P. 215-216° C. (acetone-hexane). |
| 2-(4-biphenylyl)-2-methyl-, N-butyl carbamate. | 1-butyl-5-(4-biphenyl)-5-methyl-M.P. 208-210° C. (isopropanol). |
| 2-(4-biphenylyl)-2-methyl-, N-phenyl carbamate. | 1-phenyl-5-(4-biphenylyl)-5-methyl-M.P. 170-174° C. (acetone-hexane). |
| 2-(4-biphenylyl)-2-methyl-, N-(p-chlorophenyl)carbamate. | 1-(p-chlorophenyl)-5-(4-biphenylyl)-5-methyl $\gamma_{max.}^{CHCl_3}$ 1766 cm.$^{-1}$. |
| 2-[4'-chloro-(4-biphenylyl)]-2-methyl-, N-methyl carbamate. | 1,5-dimethyl-5-[4'-chloro-(4-biphenylyl)] M.P. 209-210° C. (methylene chloride-hexane). |
| 2,2-pentamethylene-N-phenyl carbamate. | Dihydro-1'-phenylspiro[cyclohexane-1,5'-5'H-pyrano[3,2-d]oxazole]-2' 6'-[1H, 7H]-dione M.P. 163-164° C. (isopropanol). |

I claim:
1. A compound of the formula

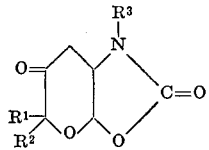

wherein R$^1$ is selected from the group which consists of phenyl, 3,4-xylyl, benzyloxyphenyl, α-hydroxybenzyl, diphenylmethyl, 4-biphenylyl and 4'-chloro-4-biphenylyl; R$^2$ is selected from the group which consists of hydrogen, lower alkyl, chloromethyl, phenyl, and benzyl; or R$^1$ and R$^2$ together represent the cyclohexane ring attached in spiral fashion to the pyrano[3,2-d]oxazole in such a manner that carbon atom-5 of the pyrano[3,2-d]oxazole is common to the cyclohexane ring; and R$^3$ is selected from the group which consists of lower alkyl, phenyl, and 4-chlorophenyl.

2. 1,5 - diphenyl - dihydro - 5H - pyrano[3,2-d]oxazole 2,6[1H,7H]-dione, as claimed in claim 1.

3. 1-methyl - 5 - chloromethyl - 5 - phenyl-dihydro-5H-pyrano[3,2-d]-oxazole-2,6[1H,7H]-dione, as claimed in claim 1.

4. 1-butyl - 5 - phenyl-5-(3,4-xylyl)-dihydro-5H-pyrano[3,2-d]-oxazole-2,6[1H,7H]-dione, as claimed in claim 1.

5. 1,5-diphenyl - 5 - (3,4-xylyl) - dihydro - 5H - pyrano[3,2-d]-oxazole-2,6[1H,7H]-dione, as claimed in claim 1.

6. 1 - methyl - 5 - (p-benzyloxyphenyl) - dihydro - 5H-pyrano[3,2-d]-oxazole-2,6[1H,7H]-dione, as claimed in claim 1.

7. 1,5-diphenyl - 5 - benzyl-dihydro-5H-pyrano[3,2-d]-oxazole-2,6[1H,7H]-dione, as claimed in claim 1.

8. 1-methyl - 5 - (α-hydroxybenzyl)-5-phenyl-dihydro-5H-pyrano[3,2-d]-oxazole-2,6[1H,7H]-dione, as claimed in claim 1.

9. 1-methyl - 5 - (diphenylmethyl)-dihydro-5H-pyrano[3,2-d]-oxazole-2,6[1H,7H]-dione, as claimed in claim 1.

10. 1,5 - dimethyl - 5 - (4 - biphenylyl)-dihydro - 5H-pyrano[3,2-d]-oxazole-2,6[1H,7H]-dione, as claimed in claim 1.

11. 1-ethyl - 5 - (4-biphenylyl) - 5 - methyl-dihydro-5H-pyrano[3,2-d]-oxazole-2,6[1H,7H]-dione, as claimed in claim 1.

12. 1-propyl - 5 - (4-biphenylyl)-5-methyl-dihydro-5H-pyrano[3,2-d]-oxazole-2,6[1H,7H]-dione, as claimed in claim 1.

13. 1-butyl - 5 - (4 - biphenylyl)-5-methyl-dihydro-5H-pyrano[3,2-d]-oxazole-2,6[1H,7H]-dione, as claimed in claim 1.

14. 1-phenyl - 5 - (4-biphenylyl)-5-methyl-dihydro-5H-pyrano[3,2-d]-oxazole-2,6[1H,7H]-dione, as claimed in claim 1.

15. 1 - (p-chlorophenyl) - 5 - (4-biphenylyl)-5-methyl-dihydro-5H-pyrano[3,2-d]-oxazole-2,6[1H,7H] - dione, as claimed in claim 1.

16. 1,5 - dimethyl - 5 - [4' - chloro-(4-biphenylyl)]-dihydro - 5H - pyrano[3,2-d]-oxazole-2,6[1H,7H]-dione, as claimed in claim 1.

17. Dihydro - 1' - phenylspiro[cyclohexane - 1,5' - 5'H-pyrano[3,2-d]oxazole]-2',6'-[1H,7H]-dione, as claimed in claim 1.

References Cited

UNITED STATES PATENTS 3,033,829  5/1962  Bakke _____ 260—77.5

ALEX MAZEL, Primary Examiner

R. V. RUSH, Assistant Examiner

U.S. Cl. X.R.

260—345.8, 345.9, 347.8, 272, 283